US011796101B2

(12) United States Patent
Watson et al.

(10) Patent No.: US 11,796,101 B2
(45) Date of Patent: Oct. 24, 2023

(54) CONNECTOR

(71) Applicant: JOHN GUEST INTERNATIONAL LIMITED, Middlesex (GB)

(72) Inventors: Daniel Watson, West Drayton (GB); Joshua Smith, West Drayton (GB)

(73) Assignee: JOHN GUEST INTERNATIONAL LIMITED, Middlesex (GB)

( * ) Notice: Subject to any disclaimer, the term of this patent is extended or adjusted under 35 U.S.C. 154(b) by 392 days.

(21) Appl. No.: 17/050,714

(22) PCT Filed: Apr. 26, 2019

(86) PCT No.: PCT/GB2019/051174
§ 371 (c)(1),
(2) Date: Oct. 26, 2020

(87) PCT Pub. No.: WO2019/207320
PCT Pub. Date: Oct. 31, 2019

(65) Prior Publication Data
US 2021/0239248 A1    Aug. 5, 2021

(30) Foreign Application Priority Data

Apr. 27, 2018 (GB) ...................................... 1806919

(51) Int. Cl.
*F16L 37/091* (2006.01)

(52) U.S. Cl.
CPC ....... *F16L 37/0915* (2016.05); *F16L 2201/10* (2013.01)

(58) Field of Classification Search
CPC . F16L 37/091; F16L 37/0915; F16L 37/0925; F16L 37/092; F16L 37/0927;
(Continued)

(56) References Cited

U.S. PATENT DOCUMENTS 4,632,437 A    12/1986 Robson et al.
5,029,908 A    7/1991 Belisaire
(Continued)

FOREIGN PATENT DOCUMENTS

DE    102007015406 B3    1/2008
EP    0378035 A1    7/1990
(Continued)

OTHER PUBLICATIONS

International Search Report dated Jun. 18, 2019, in corresponding International Application No. PCT/GB219/051174.
(Continued)

*Primary Examiner* — Aaron M Dunwoody
(74) *Attorney, Agent, or Firm* — Barnes & Thornburg LLP

(57) ABSTRACT

A connector having a body with a through-way open at one end. A shoulder in the through-way faces the open end and supports an O-ring. A cap is fitted to an open end of the body and extends from the open end toward the opposite end. The cap is a different color than the body. A gripping ring in the cap has inwardly facing teeth to grip a tube in the through-way to prevent the tube from being pulled out of the open end of the connection during use. A locking ring is fitted over the open end of the body and cap. The locking ring is rotatable between a locked position and an unlocked position. The locking ring has a window that lines up with the body in one of the locked and unlock positions and the cap in the other of the locked and unlocked positions.

20 Claims, 5 Drawing Sheets

(58) Field of Classification Search
CPC .. F16L 37/098; F16L 37/0982; F16L 2201/10
See application file for complete search history.

(56) References Cited

U.S. PATENT DOCUMENTS

| | | |
|---|---|---|
| 2005/0077723 A1 | 4/2005 | Wai et al. |
| 2006/0228621 A1 | 10/2006 | Jones et al. |
| 2008/0238096 A1 | 10/2008 | Kees et al. |
| 2011/0140417 A1 | 6/2011 | Kluss et al. |
| 2012/0104749 A1 | 5/2012 | Kang |
| 2014/0021717 A1 | 1/2014 | Burke et al. |
| 2016/0017579 A1 | 1/2016 | Schurle et al. |
| 2017/0082229 A1* | 3/2017 | Meissner ................ F16L 19/08 |

FOREIGN PATENT DOCUMENTS

| | | | | |
|---|---|---|---|---|
| EP | 1433992 A1 * | 6/2004 | | F16L 37/0925 |
| EP | 1 517 075 A2 | 3/2005 | | |
| EP | 1 972 845 A1 | 9/2008 | | |
| EP | 2 131 089 A1 | 12/2009 | | |
| EP | 2 860 436 A1 | 4/2015 | | |
| EP | 3236127 A1 | 10/2017 | | |
| JP | 2018-017336 A | 2/2018 | | |
| KR | 20050023988 A | 3/2005 | | |
| KR | 20170054122 A | 5/2017 | | |
| WO | 2005024284 A1 | 3/2005 | | |

OTHER PUBLICATIONS

Combined Search and Examination Report; British Patent Application No. 1800719.5; dated Jun. 19, 2018.
Examination Report; British Patent Application No. 1800719.5; dated May 21, 2020.
International Search Report and Written Opinion; International Patent Application No. PCT/GB2019/050071; dated Apr. 5, 2019.

* cited by examiner

CONNECTOR

CROSS-REFERENCE TO RELATED APPLICATIONS

This application is a national stage entry of International Application No. PCT/GB2019/051174 filed Apr. 26, 2019, which claims the benefit of and priority to GB Patent Application 1806919.5 filed Apr. 27, 2018, the entire contents of which are incorporated herein by reference.

BRIEF SUMMARY OF THE INVENTION

The present invention relates to a connector of the type comprising a cap and a body which are assembled together to provide a through way. A gripping ring such as a collet or grab ring is retained within the assembly. A tubular element is inserted into the through way of the connector, this is gripped by the teeth of the gripping ring. If an axial force is applied which tends to remove the tubular element from the connector, the teeth are arranged to grip the tube. For a collet, this is done by legs on which the teeth are provided being forced radially inwardly by a feature on the connector. For the grab ring, this is done by the teeth, deflecting from an initial position into a position in which they grip the tube more tightly. The greater the axial force which is applied, the greater the gripping force applied by the teeth.

BACKGROUND OF THE INVENTION

Such connectors have found widespread use in applications for connecting plastic tubes and the like, for example in plumbing, electrical cables and fibre optic applications. They provide a quick and reliable method of joining two cables together or connecting a cable to another component.

Traditionally, the cap has been ultrasonically welded to the body and this has been commercially successful. However, it does have a number of drawbacks in that the welding process requires complex equipment. The materials of the cap and body must be compatible with one another and suitable for ultrasonic welding. The components must also be sufficiently thick and robust to allow the welding.

We have made a number of attempts to improve on such a connector.

EP2860436 discloses a snap fit engagement of a cap over the body to replace the ultrasound weld. The introduction in this document refers to a connector in which the end of the cap opposite to the open end is provided with an inwardly facing annular shoulder which is fitted over a complimentary outwardly facing annular shoulder on the body. However, there are problems with such a design. Firstly, the cap with the annular shoulder has to expand radially as it is pushed onto the body which strains the caps. Secondly, when a bending load is applied to the connector, this tends to pull the snap ring away from the shoulder on one side but forces the components together on the opposite side thereby causing stresses which can crack or dislodge the cap. This is addressed in EP2860436 by providing the body with a plurality of fingers which extend toward the open end such that the snap fit is achieved towards the open end. These fingers are more flexible than an annular component which reduces the stresses upon bending. It is also easier for the fingers to deflect (as compared to the annular shoulder) when the cap is put into place thereby avoiding stresses during assembly.

A development to this idea is described in EP3236127 which uses a similar idea to that described above, only the cap angle (i.e. the surface which is inclined to engage with the collet to cause it to grip on a tube as the tube is pulled away from the open end) is now formed on the inner face of axially projecting legs of the body.

WO2005/024284 discloses an arrangement in which a cap is provided as a snap fit within the body, rather than over the body as in the above described prior art. The cap has a castellated structure with a number of legs each of which is provided with a tooth which will snap into a recess in the body. The collet has a number of legs each of which will engage with an inner edge of the cap which is defined between the legs of the cap.

Another development in the field of such connectors has been provision of a locking ring. Such an arrangement is disclosed in EP2131089. A locking ring is designed to fit over the open end of the connector and, in EP2131089 is rotated between a locked position in which movement of the collet is prevented and an unlocked position in which movement of the collet is permitted. In order to release a tube from the connector, it is necessary to push the collet a short distance into the connector. When it is held in such a position, the tube can be released because the collet is no longer able to be forced inwardly by a feature on the connector. In the locked position, because movement of the collet is prevented, any accidental force on the collet will not allow the tube to be released. However, in the unlocked position because movement of the collet is permitted, the tube can now be released from the collet as previously. Therefore, in contrast to the situation when no locking ring is provided, a two stage movement is necessary to release the tube, firstly to rotate the locking ring to the unlocked position and secondly to hold the collet inwardly of the connector so that the teeth do not engage with the tube as it is removed. A further possibility is to include a feature on the locking ring which will move the collet to this inward position (rather than simply releasing it so that it can subsequently be moved to this inward position).

A locking ring can also be provided in the case of a grab ring. In this case, the locking ring is again rotatable between a locked and an unlocked position. The unlocked position is one in which the locking ring extends further into the connector such that a portion of the locking ring engages with the teeth and deflects them radially outwardly to prevent them from gripping the tube as it is removed from the connector. The unlocked position is one in which the locking ring does not engage with the teeth allowing them to grip the tube as described above.

With such a locking ring, it is important for the user to have a visual indication of whether or not the locking ring is in its locked position so that they can easily and reliably ensure that this is the case.

This is done in EP2131089 by the provision of a window in the wall of the connector allowing the tube to be visible through the wall of the connector. The locking ring is then provided with a scalloped edge such that parts of the locking ring extends to a greater axial extent than others. The connector is configured so that, in the unlocked position, the parts of the locking ring which extend to a lesser axial extent are aligned with the openings in the connector such that the tube remains visible and provide a visual indication to the user that the connector has not yet been locked. In the locked position, the windows are covered by the parts of the locking ring which extend to a greater axial extent and signifies the locked position.

Such an arrangement is highly effective as it provides a visual indication of whether or not the locking ring has been locked. It also allows a user to see whether a tube has correctly located within the connector. However, this arrangement is limited to an inner diameter (ID) connector. Such a connector is one which is provided with an internal sleeve with an external O-ring which is configured to seal against the inner diameter of the tube inserted in the connector. It does not work with the more common outer diameter (OD) connector in which the connector is provided with an O-ring which seals against an outer diameter of the tube. In such a connector there is no direct line of sight through a portion of the body which is covered by the locking ring to the tube within the connector.

The present invention aims at providing a locking mechanism which can also be applied to an OD connector.

According to the present invention there is provided a connector.

Unlike in EP2131089 above, there is no need to have a line of sight through the body to a tube within the connector as the present invention now relies on a contrast between body and the cap material in order to provide a visual indication to the user of the locked and unlocked positions. In view of this, the present invention can be applied both to inner diameter and outer diameter connectors.

Further, EP2131089 relies on a colour contrast between the tube and the body in order to provide a visual indication. However, the connector manufacturer generally has no control over the nature of the tube to which it is attached. In practice, both the connector and the pipe are generally a white or off-white colour. As a result of this, there is relatively little visual contrast for the user between the locked and the unlocked configurations. However, in the present invention, the visual contrast is within the control of the connector manufacturer, this can be made as visually distinctive as necessary. For example, all of the components of the connector, with the exception of the cap, may be white or off-white, while the cap may be a dark highly contrasting colour.

The present invention can also be achieved without any increase in the manufacturing costs as the cap is a separate component and can therefore be moulded in a different colour of plastic. The window in the locking ring can simply be a moulded feature.

The requirement for the cap being a different colour to the body is required so that there is a visual contrast between the window lining up with the body and the window lining up with the cap. In its simplest form, the cap is formed in its entirety from a material which is a different colour from the material of the body. However, other possibilities include the part of the cap which is visible through the window being formed of a different material from the remainder of the cap. The part of the cap which is visible through the window may alternatively be printed, painted or otherwise marked in a different colour. It may be provided with some form of indicia (such as a padlock) or wording to signify the locked or unlocked position.

The cap may be welded into the body, but is preferably a snap fit. This provides the advantage that it avoids the limitations on the material which are required of a welded arrangement.

The cap may be fitted over the open end of the body but is preferably fitted within the open end of the body as this makes it easier to configure the windows and their alignment with the different colour portions.

Preferably the cap is provided with at least one radially extending lug which engages with a corresponding recess in the body. These can serve to locate the cap in the correct annular orientation as well as this radially projecting portion providing an area which is exposed at the outer face of the body such that it can be viewed through the window in the locking ring. However, any part of the cap may be positioned so as to be visible through the window. There may, for example, be a window in the body through which the cap is visible.

The cap is preferably provided with a cam surface and a cam follower is provided on the locking ring, the cam surface being configured to cause axial movement of the locking ring as it is rotated between the locked position and the unlocked position.

Because the cap is a separate component fitted within the body, it is easier to form the complex shape required for the cam surface when the cap is moulded.

The cam surface can be on the outer face or the end face of the cap. However, it is preferably on the inner face.

The cap is preferably provided with one or more detents over which a feature on the locking ring is arranged to travel as the locking ring moves between the locked and unlocked positions. This provides a "click" feel providing a tactile indication to the user that they have locked and/or unlocked the locking ring. Preferably the feature on the locking ring which travels over the detent is the same feature as the cam follower, although the two mechanisms can be separate if necessary.

The gripping ring may be a grab ring. However, preferably, the gripping ring is a collet having a plurality of legs extending away from the open end, each engaging with the cap and having the inwardly facing teeth.

More preferably, the cap is retained in the body by a snap fit, the cap having a plurality of legs extending away from the open end, the legs each having an outwardly extending tooth at the end opposite to the open end to engage with a complimentary recess in the body to provide the snap fit; at least one collet leg being configured to engage with a leg of the cap;

the cap having an inwardly facing tapered surface that is tapered to provide a cap angle that engages, in use, with the collet legs such that axial movement of the collet towards to the open end causes inward deflection of the collet legs and causes a radially outward force to be applied to the legs of the cap via a tapered surface to urge the or each tooth of the cap to its respective complimentary recess.

With such an arrangement any movement tending to cause the tube to be pulled out of the connector will cause the teeth of the collet to increase their grip on the tube as well as urging the legs of the cap into the recesses in the body. Thus, the greater the force that is applied to the tube, the greater the radial force keeping the collet, cap and body together.

This arrangement is the subject of a co-pending application GB1800719.5.

The connector may be equally applicable as an inner diameter or an outer diameter connector. However, it has a particular benefit to an outer diameter connector given that the prior art cannot be used with such an arrangement. Therefore, preferably, the O-ring is configured to seal with the outer diameter of a tube gripped, in use, by the collet.

BRIEF DESCRIPTION OF THE DRAWINGS

An example of a connector in accordance with the present invention will now be described with reference to the accompanying drawings, in which.

DETAILED DESCRIPTION OF THE INVENTION

Figure 1A:
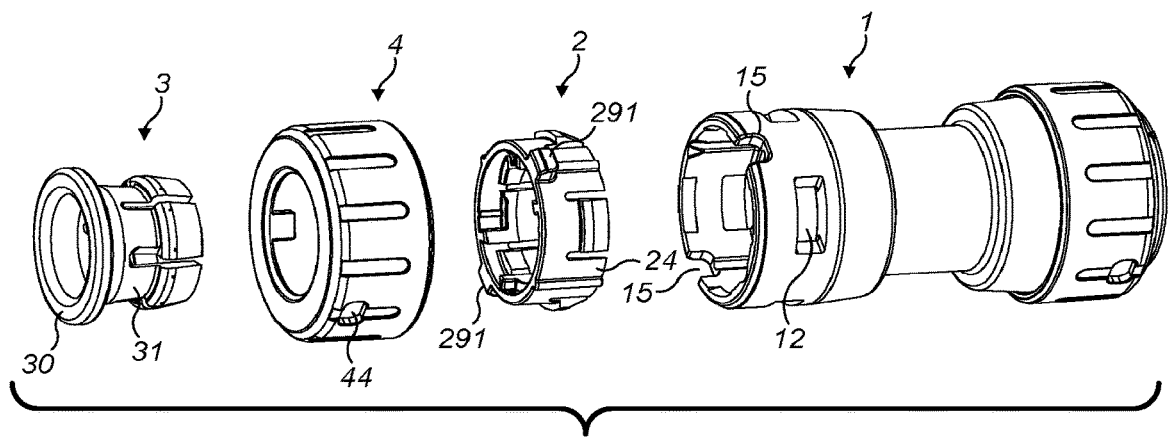
FIG. 1A is a perspective view of a double ended connector with the left hand side being shown as an exploded view and the right hand side being shown assembled.

The connector consists of four main components, namely body 1, cap 2 and collet ring 3 and locking ring 4.

As shown in the drawings, the connector is a double ended connector having a cap 2 and locking ring 4 at each end. The connector is suitable for connecting two tubes together. However, the invention could equally be applied to a single ended connector to connect the tube to an underlying structure. Alternatively, the double ended connector could be provided with a connector according to the present invention at one end and a different type of connector at the opposite end.

The body 1 is open at one end and has an axial throughway 5 extending through the connector. The throughway 5 is a stepped bore having a narrow diameter portion 6 which corresponds approximately with the inner diameter of the tube to be received. This portion 6 terminates at a first shoulder 7 facing the open end against which the tube abuts, in use. A second shoulder 8 provides a further outward step for the bore and is arranged to receive an O-ring 9 which seals, in use, against the tube.

This part of the body is of conventional design.

Also of conventional design is the collet 3. This comprises an annular ring 30 with a number discrete axially projecting legs 31 each having an inwardly facing tooth 32 to grip on the tube as described below.

The open end of the body 1 is designed to receive the cap 2. It has a plurality of axially extending recesses 11 to align with complimentary ribs 21 on the cap 2. A plurality of through holes 12 are provided through the wall of the body 1 to receive complimentary teeth 22 on the cap 2. Immediately to the right of the through holes 12 is an annular shoulder 13 which is in the plane perpendicular to the axis of the connector to provide an end stop for the cap 2 as this is inserted into the body 1. The face 14 of the recess 12 which faces the shoulder 13 is in a plane perpendicular to the axis for enhanced engagement with the tooth 22 as described below.

Figure 3:
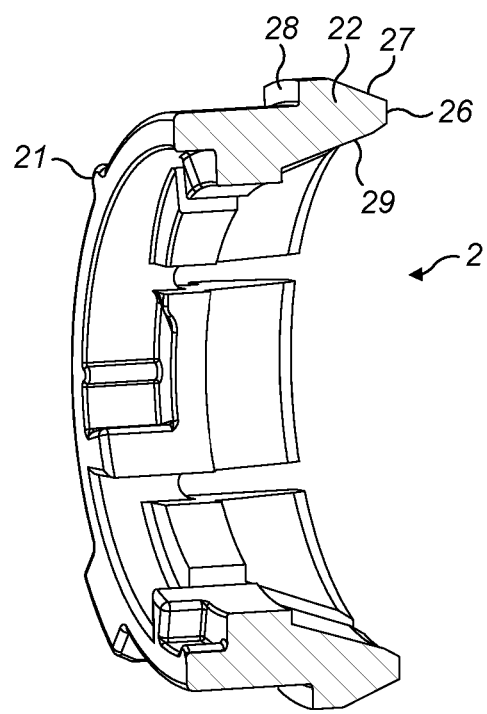
FIG. 3 is a sectioned view of the cap showing the cap of the FIG. 1B in greater detail.

The cap 2 is designed to fit within rather than over the body 1. In a similar manner to the collet, it has an annular ring 23 with a number of discrete axially projecting legs 24 separated by slots 25 so that each leg 24 is flexible. At the end of each leg furthest from the open end is an outwardly projecting tooth 22. As best shown in FIG. 3, this has a flat end face 26 to engage with the shoulder 13 to prevent over insertion of the cap. The tooth 22 has a tapered outer surface 27 to allow the legs 24 to be deflected inwardly as the cap 2 is inserted into the body 1. The tooth 22 has a planar face 28 on its outer most surface and facing the open end 4. This is designed to engage with the planar surface 13 in cap 1.

The inner face 29 of the leg 24 is tapered to provide a cap angle.

As described to date, the body 1, cap 2 and collet 3 could provide a workable connector on their own. However, the present invention is concerned with a connector which is provided with an additional component in the form of the locking ring 4.

The connector described to date is disclosed in our earlier GB1800719.5. The refinement of the present design relates a modification of the cap 2 and the provision of the locking ring 4.

The cap 2 has a pair of radially extending lugs 291 which are designed to engage in a pair of grooves 15 at the open end of the body 1 to locate the cap 2 in the body 1.

The locking ring 4 is in the form of an annular body 41 with an annular lip 42 extending radially inwardly across part of the end face at the open end of the connector. Towards an inner edge of the lip 42 is a cam follower 43 extends away from the open end of the connector. In practice, there will be a second cam follower 43 on the opposite side of the locking ring 4, although any number of cam followers may be provided in practice.

The locking ring 4 has at least one window 44 only of which is shown in the drawings. However, it is preferable that the number of windows 44 corresponds to the number of lugs 291. Although the windows 44 are shown as through holes in the wall of the annular body 41, they may be positioned differently. For example, they may be in the annular lip 42, or, rather than being through holes in the wall of the annular body 41, they may be in the form of a scalloped edge at the end of the locking ring 4 opposite to the lip 42.

The purpose of the windows 44 is to align with the lugs 291 in one of locked or unlocked positions. The cap 2 is visually distinctive from the body 1. The cap 2 is also preferably visually distinctive from the locking ring 4. In practice, the body 1 is a moulded plastic component which is of a material which is, for example, off-white, grey or black. The collet 3 and locking ring 4 as the body 1 are often the same colour. However, the cap 2 is made from a material which has a high colour contrast to the locking ring 4. For example, it is a dark red or dark green colour.

The point of this high colour contrast is that the lugs 291 (which are of the high contrast material) are visible through the windows 44 when the locking ring 4 is in either the locked or the unlocked position. The exact convention for this is an immaterial. For example, if the cap 2 is made of a red material it is preferable that the windows 44 are aligned with the lugs 291 in an unlocked configuration. On the other hand, if it is a green material, the alignment may occur in the locked positon. The user therefore has a visual indication that, for example, if they can see a red material through the window 44, the connector is not yet locked.

In order to achieve the high colour contrast to provide the visual indication, it is only necessary for the radially outmost face of the lug 291 to be of the high contrast colour. In practice, however, this is most easily achieved by making the whole of cap 2 from a different colour material (for example by moulding it in plastic) as this allows it to be done in a single moulding step and therefore does not create any additional complexity in the manufacturing process.

The cam follower 43 is positioned to engaged with a cam groove 292 on the inside face of the cap 2 towards the open end. The cam groove 292 has a ramp 293 such that the cam groove 292 effectively comprises a shallow portion 294 and a deeper portion 295. When the cam follower 43 is in a deeper portion 295, this corresponds to the unlocked position shown in FIG. 5 as the collet 3 is free to move to a small extent in the axial direction. Thus, by pushing on the annular ring 30, the collet can be pushed into the body 1 and, if it is held in this position, the tube can be withdrawn from the connector without the cam legs 3 riding up the cam follower 29 to grip the tube.

Figure 5:
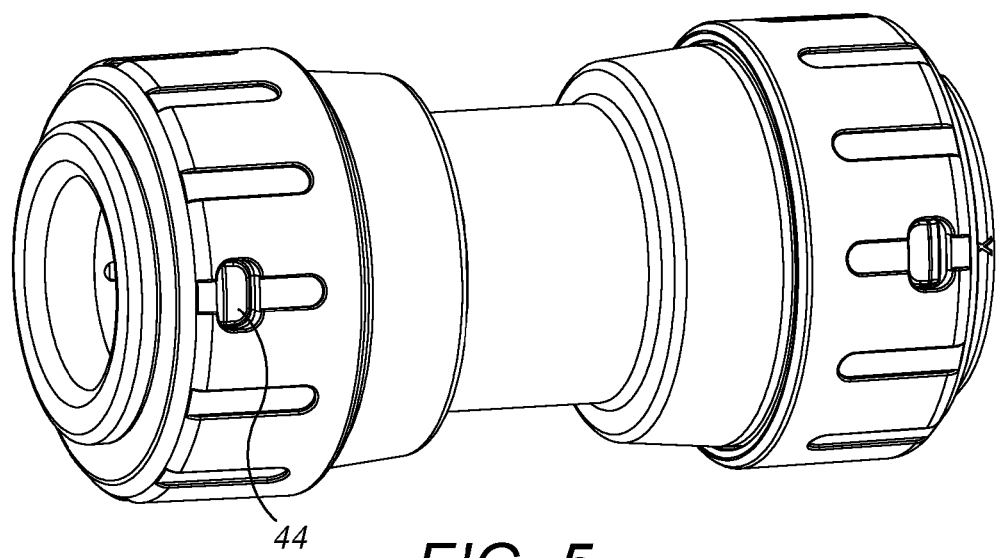
FIG. 5 is a view similar to FIG. 4 with the locking rings in a locked configuration.

By contrast, when the cam follower 43 is rotated up the ramp 293 to the shallower portion 294, the cam follower abuts a surface 296 such that it is forced away from the open end to the position shown in FIG. 5 in which it now bears against the underside of the annular ring 30 to prevent the inward movement of the collet 3 described above.

As it moves between the two positions, the cam follower 43 will ride over a detent 297 which provides the user with a tactile indication that they have moved between the two positions.

Figure 4:
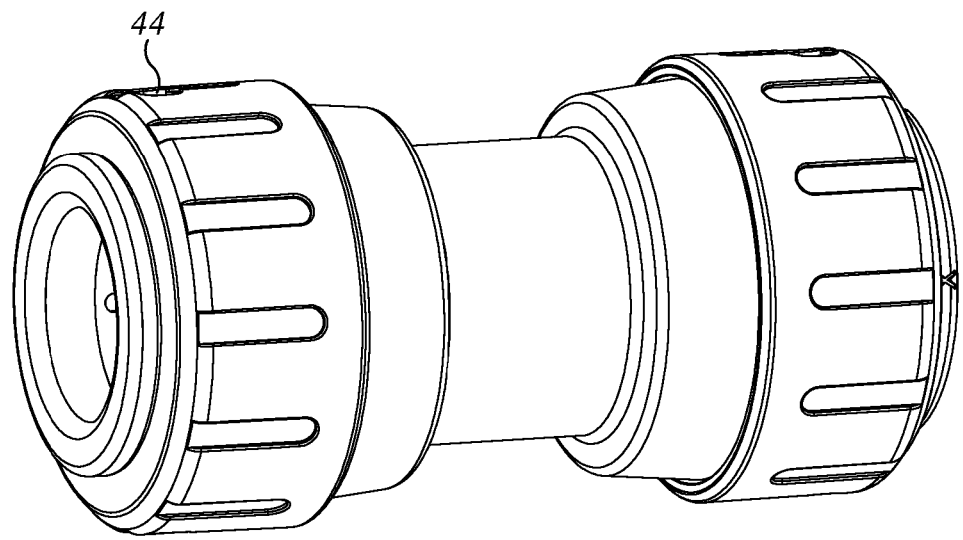
FIG. 4 is a perspective view of the connector of FIG. 1A with the locking rings in an unlocked configuration.

As can be seen from a comparison of FIGS. 4 and 5, the window 44 moves to a different circumferential position. In one of the circumferential positions it will be aligned with the lug 291 such that the colour of the lug 291 will be displayed to the user. In the other position, it will align with a portion of the body 1 such that the body colour will be visible through the window. Preferably the connector is configured so that the lugs 291 are visible through the windows 44 in the unlocked configuration as it is more convenient to display, for example, a red colour to the user effectively acting as a warning that the device is not locked. Once the locking ring is in the locked position and the window 44 is aligned with the underlying material of the body 4, the window is far less noticeable in the locked condition.

In order to assemble to connector, the cap 2 is inserted into the body 1 deflecting the legs 24 until the end face 26 of the tooth lands on the shoulder 13. At this point, the legs 24 which have been deflected inwardly by the tapered surface 27 snap into the recesses 12 and the axial face 28 of the tooth engages against the complimentary face 14 in the cap 1.

The collet can then be inserted in the conventional manner into the locking ring 4 and onto the assembled body 1 and cap 2.

Figure 1B:
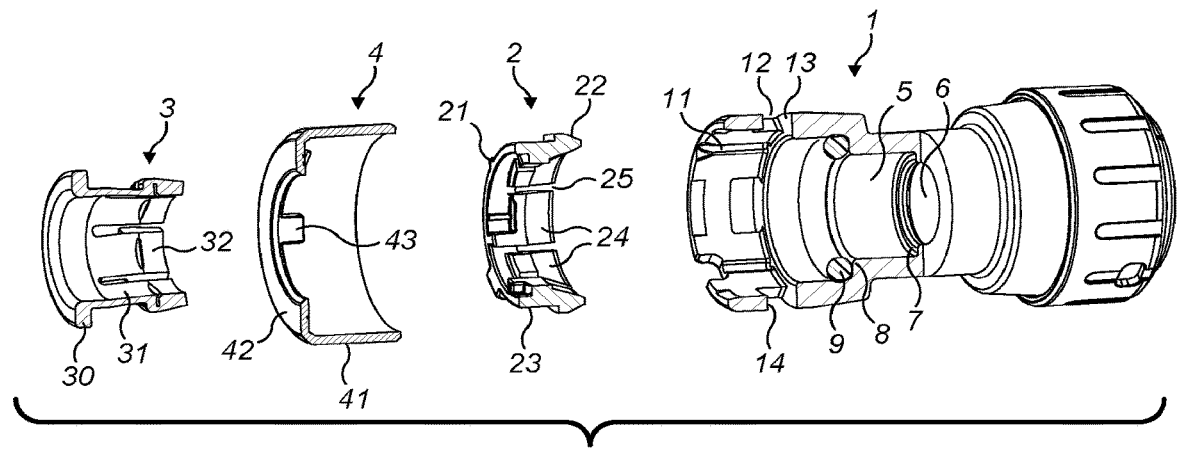
FIG. 1B is a view similar to FIG. 1A with the left hand exploded perspective view shown as having been sectioned along axial plane.
Figure 1C:
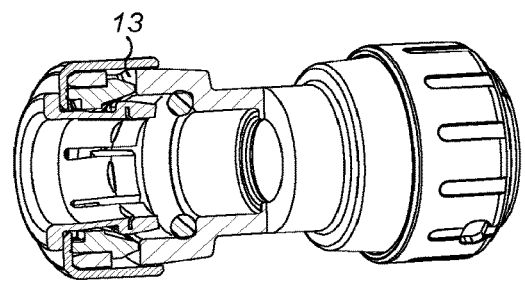
FIG. 1C is a view similar to FIG. 1B in non-exploded form.
Figure 2:
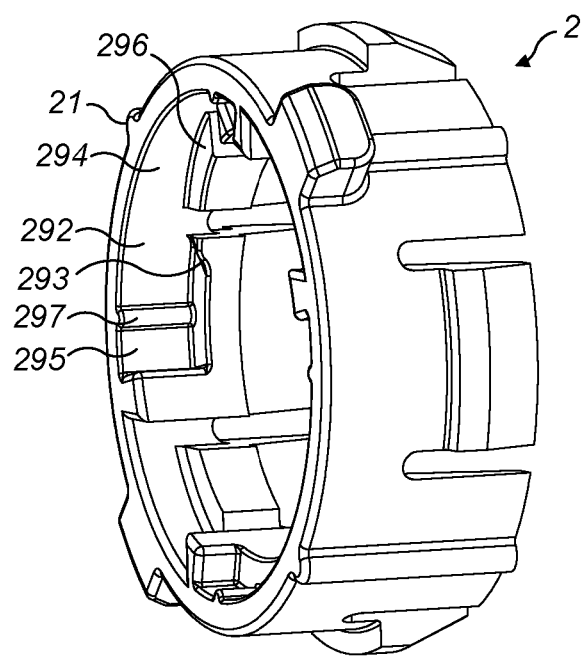
FIG. 2 is a perspective view of the cap showing the same view of the cap as in FIG. 1A but in greater detail.

In the position shown in FIG. 1C, a tube is inserted into the open end and lands of the shoulder 6. The O-ring seal 9 engages with the outer face of the tube to provide a sealed connection while the teeth 32 grip the tube.

The connector is designed to prevent the tube from being removed from the connector by the application only of an axial force on the tube. When an axial force is applied to the tube, the engagement between the teeth 32 and the tube ensures that the collet 3 is moved to the left (using the orientation of FIGS. 1A to 1C). The legs of the collet then ride up at the cap angle 29 causing the legs 31 to be deflected inwardly and the teeth 32 to grip the tube with a force which increases as the axial force on the tube increases.

With the current design, as well as the axial force causing an increased gripping force on the tube, the interaction between the collet legs 31 and the legs 24 of the cap 2 provides a radially outward resultant force on the legs 24 which urges the teeth 22 more deeply into the recesses 12 in order to cause the cap 2 to grip more tightly within the body 1. The planar face 28 on the tooth 22 allows the tooth 22 to be deflected into the recess 12 and the face to face contact between the face 28 and the face 14 provides a strong resistance to the axial force.

Figure 6A:
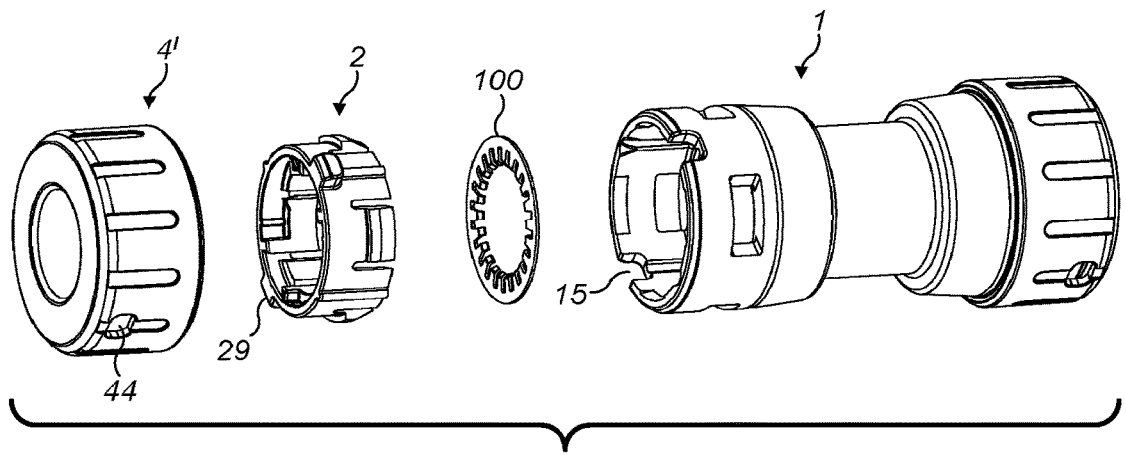
FIGS. 6A to 6C are views similar to FIG. 1A to 10 showing a second example of the present invention.
Figure 6B:
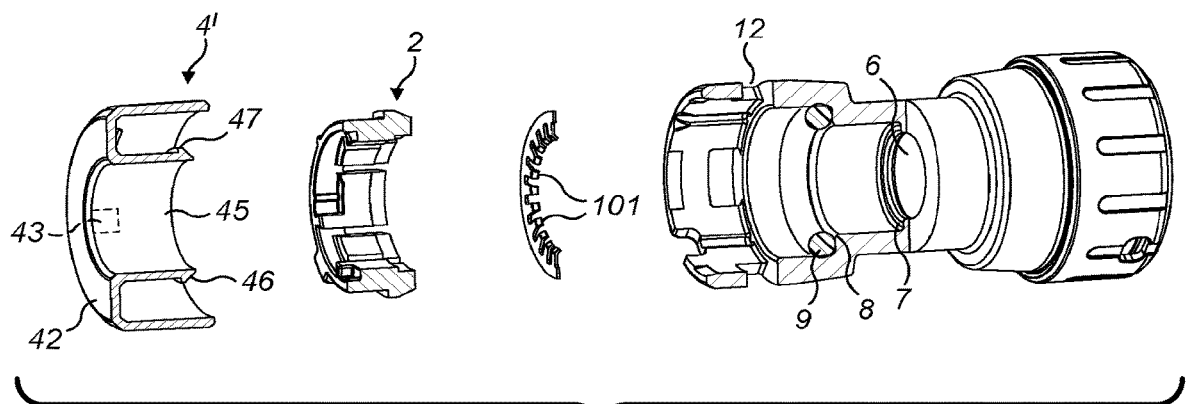
Figure 6C:
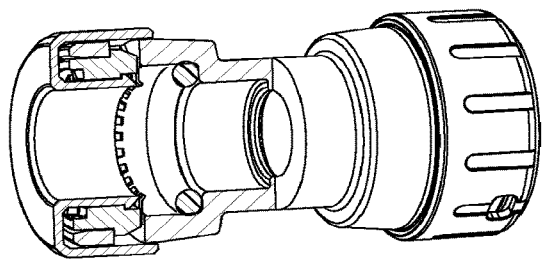

A second example of a connector will now be described with reference to FIGS. 6 and 7.

In this example, the collet 3 has been replaced by a grab ring 100. The remaining components are essential the same and only the differences have been described below.

The grab ring 100 is in the form of a ring which is typically of stamped metal. The ring has a plurality of inwardly extending teeth 101 by the ends of which are deflected away from the open end of the connector. In use, when a tube is inserted into the connector, it can pass through the angled teeth which, in view of their angled ends are deflected outwardly by the insertion of the tube. However, any attempt to remove the tube causes the angled teeth to dig into the wall of the tube and further movement in this direction will cause tighter gripping of the tube.

Figure 7A:
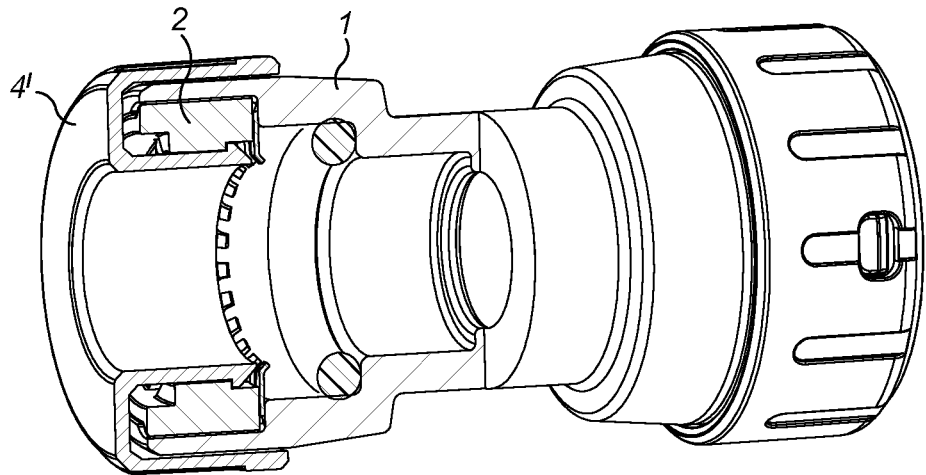
FIG. 7A is an enlarged version of FIG. 6C showing the locking ring in a locked configuration.
Figure 7B:
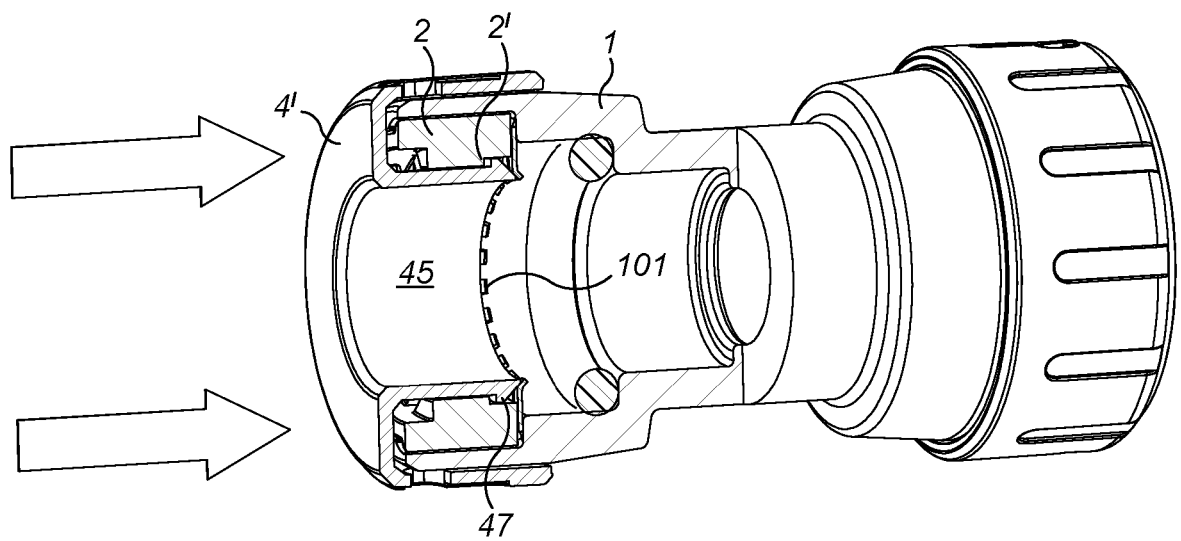
FIG. 7B is a view similar to FIG. 7A showing the locking ring in an unlocked configuration.

The grab ring 101 is sandwiched between the body 1 and cap 2 as best shown in FIGS. 7A and 7B.

As compared with the previous example, the locking ring 4' has an inwardly extending annular skirt 45 extending axially from the innermost edge of the lip 42. The skirt 45 has an inclined face 46 at its axially innermost and radially outermost edge. This end face of the skirt 45 is also provided as a barb 47 which engages with a corresponding shoulder 2' on the cap 2 in order to retain the locking ring 4' on the cap 2.

The movement of the locking ring 4' between the locked and unlocked positons is brought about in the same way as with the previously described example by a cam follower 43 engaging in a cam groove 294. This time, however, the cam follower 43 is provided on the radially outermost face of the skirt 45.

In this example, however, the position in which the locking ring 4' is axially outermost (shown in FIG. 7A) corresponds to a locked position and the position in which it is axially innermost (FIG. 7B) corresponds to the unlocked position. As will be apparent from FIG. 7B, in the unlocked position, the angled face 46 engages with the teeth 101 and deflects them radially outwardly such that they will not grip the tube as it is removed. By contrast with the previous example, the second example just requires the locking ring 4' to be moved, while the first example requires both movement of the locking ring and the axial displacement of the collet as described above.

The invention claimed is:

1. A connector comprising:
a body having a through-way which is open at one end; a shoulder in the through-way faces the open end and supports an O-ring;
a cap fitted to an open end of the body and extending from the open end towards the opposite end, the cap being a different colour to the body;
a gripping ring in the cap and having a plurality of inwardly facing teeth to grip, in use, a tube in the through-way to prevent the tube from being pulled out of the open end of the connector; and
a locking ring fitted over the open end of the body and cap, the locking ring being rotatable between a locked position in which the teeth of the gripping ring can engage the tube and an unlocked position in which the teeth of the gripping ring are prevented from engaging the tube;

the locking ring having a viewing window which lines up with the body in one of the locked and unlocked positions and the cap in the other of the locked and unlocked positions;

wherein the cap includes a plurality of legs to engage with a complementary recess in the body; wherein, during assembly, each one of the plurality of legs is deflected into its respective complementary recess.

2. A connector according to claim 1, wherein the cap is formed of a different colour of material from the body.

3. A connector according to claim 2, wherein the cap is moulded of a different colour of plastic from the body.

4. A connector according to claim 1, wherein the cap is a snap fit to the body.

5. A connector according to claim 4, wherein the plurality of legs extend away from the open end, the legs each having an outwardly extending tooth at the end opposite to the open end to engage with its complementary recess in the body to provide the snap fit; at least one collet leg being configured to engage with a respective one of the plurality of legs of the cap; the cap having an inwardly facing tapered surface that is tapered to provide a cap angle that engages, in use, with the collet legs such that axial movement of the collet towards to the open end causes inward deflection of the collet legs and causes a radially outward force to be applied to the plurality of legs of the cap via a tapered surface to urge the or each tooth of the cap to its respective complementary recess.

6. A connector according to claim 1, wherein the cap is fitted within the open end of the body.

7. A connector according to claim 1, wherein the cap is provided with at least one radially extending lug that engages with a corresponding recess in the body the cap is deflected and engages in recess.

8. A connector according to claim 1, wherein the cap is provided with a cam surface and a cam follower is provided on the locking ring, the cam surface being configured to cause axial movement of the locking ring as the locking ring is rotated between the locked position and the unlocked position.

9. A connector according to claim 8, wherein the cam surface is an inner face of the cap.

10. A connector according to claim 8, wherein the cap is provided with one or more detents over which a feature on the locking ring is arranged to travel as the locking ring moves between the locked and unlocked positions.

11. A connector according to claim 10, wherein the feature on the locking ring which travels over the detent is the same feature as the cam follower.

12. A connector according to claim 1, wherein the gripping ring is a collet having a plurality of legs extending away from the open end, each engaging with the cap and having the inwardly facing teeth.

13. A connector according to claim 12, wherein the O-ring is configured to seal with the outer diameter of a tube gripped, in use, by the collet.

14. A connector comprising:
a body having a through-way which is open at one end; a shoulder in the through-way faces the open end and supports an O-ring;
a cap fitted to an open end of the body and extending from the open end towards the opposite end, wherein the cap is a snap fit to the body, the cap being a different colour to the body;
a gripping ring in the cap and having a plurality of inwardly facing teeth to grip, in use, a tube in the through-way to prevent the tube from being pulled out of the open end of the connector; and
a locking ring fitted over the open end of the body and cap, the locking ring being rotatable between a locked position in which the teeth of the gripping ring can engage the tube and an unlocked position in which the teeth of the gripping ring are prevented from engaging the tube;
the locking ring having a viewing window which lines up with the body in one of the locked and unlocked positions and the cap in the other of the locked and unlocked positions.

15. A connector according to claim 14, wherein the gripping ring is a collet having a plurality of legs extending away from the open end, each engaging with the cap and having the inwardly facing teeth.

16. A connector according to claim 15, wherein the O-ring is configured to seal with the outer diameter of a tube gripped, in use, by the collet.

17. A connector according to claim 14, wherein the cap has a plurality of legs extending away from the open end, the legs each having an outwardly extending tooth at the end opposite to the open end to engage with a complementary recess in the body to provide the snap fit; at least one collet leg being configured to engage with a leg of the cap; the cap having an inwardly facing tapered surface that is tapered to provide a cap angle that engages, in use, with the collet legs such that axial movement of the collet towards to the open end causes inward deflection of the collet legs and causes a radially outward force to be applied to the legs of the cap via a tapered surface to urge the or each tooth of the cap to its respective complementary recess.

18. A connector comprising:
a body having a through-way which is open at one end; a shoulder in the through-way faces the open end and supports an O-ring;
a cap fitted to an open end of the body and extending from the open end towards the opposite end, the cap being a different colour to the body;
a gripping ring in the cap and having a plurality of inwardly facing teeth to grip, in use, a tube in the through-way to prevent the tube from being pulled out of the open end of the connector, wherein the gripping ring is a collet having a plurality of legs extending away from the open end, each engaging with the cap and having the inwardly facing teeth; and
a locking ring fitted over the open end of the body and cap, the locking ring being rotatable between a locked position in which the teeth of the gripping ring can engage the tube and an unlocked position in which the teeth of the gripping ring are prevented from engaging the tube;
the locking ring having a viewing window which lines up with the body in one of the locked and unlocked positions and the cap in the other of the locked and unlocked positions.

19. A connector according to claim 18, wherein the cap is a snap fit to the body.

20. A connector according to claim 18, wherein the cap has a plurality of legs extending away from the open end, the legs each having an outwardly extending tooth at the end opposite to the open end to engage with a complementary recess in the body to provide a snap fit; at least one collet leg being configured to engage with a leg of the cap; the cap having an inwardly facing tapered surface that is tapered to provide a cap angle that engages, in use, with the collet legs such that axial movement of the collet towards to the open end causes inward deflection of the collet legs and causes a radially outward force to be applied to the legs of the cap via a tapered surface to urge the or each tooth of the cap to its respective complementary recess.

\* \* \* \* \*